United States Patent [19]

Pormale et al.

[11] 3,925,356

[45] Dec. 9, 1975

[54] HIGH-MOLECULAR DERIVATIVE OF 2-DIMETHYLAMINOETHYL ESTER OF P-BUTYLAMINOBENZOIC ACID, METHOD FOR PREPARING SAME AND APPLICATION THEREOF

[76] Inventors: Milda Yanovna Pormale, ulitsa Suvorova 104, kv. 10; Nadezhda Alexandrovna Kashkina, ulitsa Talsu 9/11, kv. 22; Elfrida Indrikovna Veinberg, ulitsa Volguntes, 78, kv. 1a; Arvid Yanovich Kalninsh, ulitsa Sverdlova 8, kv. 3; Janis Shusters, ulitsa Kveles 15, korpus 4, kv. 30; Valdis Danielovich Mikazhans, ulitsa Marupes 17, kv. 35; Indulis Valdovich Purvinsh, ulitsa Marupes, 17, kv. 86a, all of Riga; Antons Petrovich Skutelis, Tuberkuleznaya bolnitsa "Jugla", korpus 1, kv. 7, Rizhsky raion, Stopinsky S/S, all of U.S.S.R.

[22] Filed: May 15, 1973

[21] Appl. No.: 360,479

[52] U.S. Cl. ............................ 260/214; 424/180
[51] Int. Cl.$^2$ .................... C08B 3/00; A01N 9/00
[58] Field of Search ............ 260/214, 231 CM, 232

[56] References Cited
UNITED STATES PATENTS 2,310,729   2/1943   Bley .................................. 260/214

Primary Examiner—Ronald W. Griffin
Attorney, Agent, or Firm—Haseltine, Lake & Waters

[57] ABSTRACT

The high-molecular derivative of 2-dimethylaminoethyl ester of p-butylaminobenzoic acid having the general formula

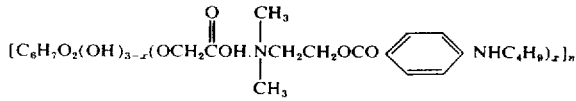

where $x$ is the degree of substitution from 0.6 to 1.5 and $n$ is the degree of polymerization from 30 to 120.

6 Claims, No Drawings

HIGH-MOLECULAR DERIVATIVE OF 2-DIMETHYLAMINOETHYL ESTER OF P-BUTYLAMINOBENZOIC ACID, METHOD FOR PREPARING SAME AND APPLICATION THEREOF

The method for preparing the above-named compound consists in the interaction between cellulosoglycolic acid and 2-dimethylaminoethyl ester of p-butylaminobenzoic acid in an aqueous medium at a temperature from 40° to 45°C with subsequent isolation of the end product from the obtained solution.

The medicinal preparation of local anesthetic action contains an active principle which is the high-molecular derivative of 2-dimethylaminoethyl ester of p-butylaminobenzoic acid, in combination with distilled water.

The present invention relates to a novel substance, viz., high-molecular derivative of 2-dimethylaminoethyl ester of p-butylaminobenzoic acid, to a method for preparing same and application thereof.

The novel substance has the following general formula n

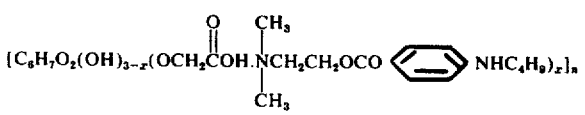

where $x$ is the degree of substitution from 0.6 to 1.5, and $n$ is the degree of polymerization from 30 to 120.

The said compound is a white or slightly yellow amorphous hygroscopic substance readily soluble in water, insoluble in non-polar solvents, decomposing when exposed to the action of alkali.

The said high-molecular derivative of 2-dimethylaminoethyl ester of p-butylaminobenzoic acid has biological activity and can be used in medicine as an active principle in local anesthetics.

According to the invention, the method for preparing the high-molecular derivative of 2-dimethylaminoethyl ester of p-butylaminobenzoic acid consists in the interaction between cellulosoglycolic acid and 2-dimethylaminoethyl ester of p-butylaminobenzoic acid in an aqueous medium at a temperature 40°–45°C with subsequent isolation of the main product from the obtained solution.

As cellulosoglycolic acid reacts with 2-dimethylaminoethyl ester of p-butylaminobenzoic acid, the hydrogen atom of the cellulosoglycolic acid accepts the unshared electron pair of the nitrogen atom belonging to the amino group in the lateral aliphatic chain of the molecule of 2-dimethylaminoethyl ester of p-butylaminobenzoic acid, and the hydrogen atom is thus split off. The nitrogen-containing group gets positively charged.

In order to ensure high quality of the product, the process of interaction between cellulosoglycolic acid and 2-dimethylaminoethyl ester of p-butylaminobenzoic acid should be carried out at equimolecular ratios, calculating with reference to the carboxyl groups of cellulose and amino groups of the aliphatic chain of the molecule of 2-dimethylaminoethyl ester of p-butylaminobenzoic acid.

The process for preparing the high-molecular derivative of 2-dimethylaminoethyl ester of p-butalaminobenzoic acid can be effected with excess quantities of 2-dimethylaminoethyl ester of p-butylaminobenzoic acid with subsequent removal of the excess of the said ester by washing with acetone or ethyl alcohol during precipitation of the main product.

Sterile powder of the end product is prepared by lyophilic drying of the obtained solution.

As it has already been said, the high-molecular derivative of 2-dimethylaminoethyl ester of p-butylaminobenzoic acid is the active principle of a local anesthetic used in ophthalmological and otorhinolaryngological practice, in peridural anesthesia.

The proposed new preparation of local anesthetic action is used as a solution of the active principle, the high-molecular derivative of 2-dimethylaminoethyl ester of p-butylaminobenzoic acid in distilled water.

It is recommended that use be made of aqueous solutions having the concentration of the active principle of 0.16 – 4.48 percent by weight.

With respect to the mechanism of its action, the proposed preparation does not differ from dicain (*Tetracaini hydrochloridum* or Pantocain), but has a more pronounced and prolonged surface anesthetic effect. Furthermore, the new preparation is less toxic than dicain. The comparative characteristics of the local anesthetic action of the proposed preparation and dicain were studied by the Bülbrin and Wajda method on guinea pigs, into whose conjunctival sacs one drop of the proposed preparation and dicain were instilled in 4–6 various concentrations from 1.04 to 8.3 mmole/liter. The effectiveness of the surface anesthesia was estimated at 5-minute intervals until the sensitivity of the cornea was completely restored, as proved by all five touch test. Each concentration was tested on six animals, which was essential for the judgement on the dynamics of the effectiveness of the surface anesthesia, as well as on the length of the anesthetic effect of the preparation.

For a better comparison of the activity by the Miller and Tainter method, mean concentrations ($EC_{50}$) of the preparation ensuring 50 percent anesthesia during the first 30-minute period following the administration of the preparation were determined, and their activity with respect to that of dicain in aqueous solution was assessed. From the thus-obtained data, the relative activity of the preparation was determined (the activity of dicain in aqueous solution was assumed 1). The obtained data show that the preparation containing the high-molecular derivative of 2-dimethylaminoethyl ester of p-butylaminobenzoic acid is 2.1 times more effective than dicain with respect to its surface anesthetic effect on the cornea of the eye in guinea pigs. With respect to the length of the permeation anesthetic effect, the proposed preparation is 1.5 – 2 times as superior as the corresponding equimolar solutions of dicain.

The permeation (surface) anesthesia was compared by the Rénier method on rabbits, into the conjunctival sacs of which 2 drops of the proposed preparation and dicain in seven various concentrations from 1.0 to 7.0 mmole/liter were instilled. The average Rénier index was found from the obtained results, with the reliable limits for each test concentration at $p = 0.05$. Moreover, the length of the anesthetic effect on the cornea was assessed by continuing the determination of the Rénier index at 5-minute intervals until the sensitivity of the cornea was completely restored as proved by the winking reflex to the first touch by a hair.

Each concentration was tested on five animals, and the response indices during 1 hour were summarized for each animal. It has been found that with respect to the surface anesthetic effect, the proposed preparation containing the high-molecular derivative of 2-dimethylaminoethyl ester of p-butylaminobenzoic acid is 1.5 - 10 times more effective than dicain.

The study of acute toxicity was carried out on 108 albino mice (both males and females) with intraperitoneal administration of the preparation. Each dose was given to a group of animals consisting of 6-12 mice. The determination of acute toxicity of the preparation was done graphically by the Litchfield and Wilcoxon method on punched cards by calculating the mean values with their reliable limits at $P = 0.05$. The processing of the obtained results has shown that the proposed preparation is 1.3 times less toxic than dicain.

The range of the therapeutic action of the proposed preparation used for surface anesthesia is 2.6 times wider than that of dicain.

In ophthalmological practice, during extraction of foreign objects and various other surgical interventions on the eye, the preparation containing the high-molecular derivative of 2-dimethylaminoethyl ester of p-butylaminobenzoic acid is given in doses of 2-3 drops of a 0.40-4.48 percent solution.

In otorhinolaryngological practice, in some operative interventions (puncture of the sinus, adenotomy, conchotomy, operation on the middle ear) the proposed preparation is used in the following doses: 1-2 ml of 1.0 - 2.24 percent solution.

For the peridural anesthesia, the following doses of the proposed preparation are used: 15-20 ml of a 0.48 percent solution.

The greatest doses of the proposed preparation for adults: in anesthesia of the upper respiratory ducts — 0.14 - 0.18 g (single dose); in peridural anesthesia, 0.113-0.150 g (single dose).

The contraindications for use are the same as with dicain.

The method for preparing the high-molecular derivative of 2-dimethylaminoethyl ester of p-butylaminobenzoic acid, which is an active principle of a local anesthetic, is effected as follows.

The reaction of interaction between cellulosoglycolic acid and 2-dimethylamoniethyl ester of p-butylaminobenzoic acid is carried out in an aqueous medium, in which cellulosoglycolic acid is dissolved, while 2-dimethylaminoethyl ester of p-butylaminobenzoic acid remains undissolved.

The process is effected at a temperature of 40°-50°C with intense stirring. The completeness of the process is controlled by determining the pH of the medium (6.5 - 7.0). As soon as the reaction has been completed, the prepared solution is separated from mechanical admixtures on a filter and dried lyophilically. If 2-dimethylaminoethyl ester of p-butylaminobenzoic acid is taken in excess, the high-molecular derivative of 2-dimethylaminoethyl ester of p-butylaminobenzoic acid obtained in the reaction is precipitated by acetone or ethyl alcohol taken in a quantity 5-10 times exceeding the volume of the starting solution.

The yield of the end product is 72.0 - 98.2 percent by weight.

For a better understanding of the invention, the following examples of its practical embodiment are given by way of illustration.

EXAMPLE 1

10 g of cellulose are treated with 100 ml of a 30 percent solution of sodium hydroxide and 4.5 g of $H_2O_2$ (15 ml of a 30 percent solution) at a temperature of 35°C for 1 hour. Alkalicellulose is treated on a press, until its weight is three times that of the starting weight of the polymer, then ground, and kept at a temperature of 45°C for 3 hours. Alkalicellulose is then transferred into a three-necked flask provided with a reflux condenser, a stirrer and a thermometer, 140 ml of isopropyl alcohol are added and then, at a temperature of 50°-60°C, 12 g of crystalline monochloroacetic acid are added gradually with stirring. The reaction is continued for 4-6 hours.

The thus obtained product is separated from the liquid phase and mixed with a 70 percent ethyl alcohol. A 30 percent solution of acetic acid is then added to neutralize excess alkali. The product is washed with a 70 percent ethyl alcohol to neutral reaction and re-precipitated two times with another washing with ethyl alcohol to remove possible admixtures. The thus obtained carboxymethylcellulose has the degree of substitution 0.99 and the degree of polymerization 115. The yield is 12.0 g (which is 92 percent by weight of theory).

10 g of the product are solved in 200 ml of water and the solution is passed through a cation exchanger (the H-form, the volumetric capacity, 4.7 mg-equiv. per gram).

The COOH— group content of cellulose is determined by potentiometric titration and by drying a sample of cellulose to constant weight.

To 100 ml of a 5 percent solution of cellulosoglycolic acid are added 6.11 g of 2-dimethylaminoethyl ester of p-butylaminobenzoic acid, and the components are mixed for 30 minutes at a temperatures of 45°C and the pH of the medium of 6.8. The thus prepared solution is then passed through a filter and dried lyophilically.

The yield of the end product is 11.1 g.

Calculated, from the formula (in percent by weight): N, 5.78 Found (in percent by weight): N, 5.59; 5.66.

EXAMPLE 2

10 g of carboxymethylcellulose (the degree of substitution 0.80 and the degree of polymerization 500) are mixed with 100 ml of water, and 2 ml of a 30 percent solution by hydrogen peroxide are added. The mixture is kept at a temperature of 45°C for 2-3 hours, then passed through a filter and a cation-exchanger in the H-form. The prepared celluloseglycolic acid has the degree of polymerization of 76.

To 100 ml of a 5 percent solution of celluloseglycolic acid are added 5.1 g of 2-dimethylaminoethyl ester of p-butylaminobenzoic acid. The process is conducted at a temperature of 50°C for 30 minutes until the pH of the solution is 6.6 - 6.8. The prepared solution is filtered and dried by lyophilization. The yield of the end product is 9.80 g which is 97 percent by weight of theory.

Calculated, in percent: N 5.34; 2-dimethylaminoethyl ester of p-butylaminobenzoic acid 50.5. Found, in percent: N 5.26; 2-dimethylaminoethyl ester of p-butylaminobenzoic acid 49.7.

EXAMPLE 3

To 100 ml of a 5 percent aqueous solution of cellulosoglycolic acid prepared by the process described in Example 2 (the degree of substitution 0.80, and the degree of polymerization 76) are added 6.0 g of 2-dimethylaminoethyl ester of p-butylaminobenzoic acid. The components are mixed at a temperature of 40°C for 1 hour. The-thus obtained product is precipitated and washed with ethyl alcohol or acetone. The product is then dried in vacuum at a temperature of 65°C to constant weight.

The yield of high-molecular derivative of 2-dimethylaminoethyl ester of p-butylaminobenzoic acid is 7.92 g which is 72 percent of by weight of theory.

Calculated, in percent: N 5.34; 2-dimethylaminoethyl ester of p-butylaminobenzoic acid 50.5. Found, in percent: N 4.70; 2-dimethylaminoethyl ester of p-butylaminobenzoic acid 46.3.

What we claim is:

1. A high-molecular derivative of 2-dimethylaminoethyl ester of p-butylaminobenzoic acid having the general formula

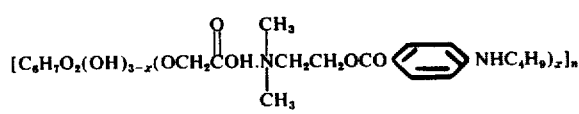

where $x$ is the degree of substitution from 0.6 to 1.5, and $n$ is the degree of polymerization from 30 to 120.

2. A method for preparing a high-molecular derivative of 2-dimethylaminoethyl ester of p-butylaminobenzoic acid having the general formula

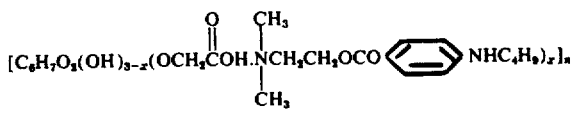

where $x$ is the degree of substitution from 0.6 to 1.5 and $n$ is the degree of polymerization from 30 to 120, consisting in the interaction between cellulosoglycolic acid and 2-dimethylaminoethyl ester of p-butylaminobenzoic acid in an aqueous medium at a temperature from 40° to 45°C, with subsequent isolation of the end product from the obtained solution.

3. A method according to claim 2, in which 2-dimethylaminoethyl ester of p-butylaminobenzoic acid and cellulosoglycolic acid are taken in equimolecular quantities.

4. A method according to claim 2, in which the end product is isolated by precipitation with acetone.

5. A method according to claim 2, in which the end product is isolated by precipitation with ethyl alcohol.

6. A method according to claim 2, in which the end product is isolated by lyophilic drying of the obtained solution.

* * * * *